(12) United States Patent
Watanabe et al.

(10) Patent No.: US 8,219,285 B2
(45) Date of Patent: Jul. 10, 2012

(54) ELECTRIC POWER STEERING SYSTEM DESIGNED TO GENERATE TORQUE FOR ASSISTING DRIVER'S TURNING EFFORT

(75) Inventors: Daiji Watanabe, Nagoya (JP); Motoaki Kataoka, Kariya (JP); Tomoyuki Hori, Handa (JP)

(73) Assignee: Denso Corporation, Kariya (JP)

( * ) Notice: Subject to any disclaimer, the term of this patent is extended or adjusted under 35 U.S.C. 154(b) by 371 days.

(21) Appl. No.: 12/705,029

(22) Filed: Feb. 12, 2010

(65) Prior Publication Data

US 2010/0204889 A1 Aug. 12, 2010

(30) Foreign Application Priority Data

Feb. 12, 2009 (JP) .................................. 2009-030266

(51) Int. Cl.
*B62D 6/00* (2006.01)
(52) U.S. Cl. ......................................................... 701/42
(58) Field of Classification Search ..................... 701/42
See application file for complete search history.

(56) References Cited

U.S. PATENT DOCUMENTS

| | | | |
|---|---|---|---|
| 6,450,287 B1 | 9/2002 | Kurishige et al. | |
| 2005/0103561 A1 | 5/2005 | Endo et al. | |
| 2009/0112406 A1* | 4/2009 | Fujii et al. | 701/42 |
| 2009/0192679 A1* | 7/2009 | Kobayashi et al. | 701/42 |

FOREIGN PATENT DOCUMENTS

| | | |
|---|---|---|
| EP | 1 077 171 | 2/2001 |
| EP | 1077171 A2 * | 2/2001 |
| JP | 11-321685 | 11/1999 |
| JP | 2002-369565 | 12/2002 |
| JP | 2003-200844 | 7/2003 |
| JP | 2006-281880 | 10/2006 |
| JP | 2007-269140 | 10/2007 |
| JP | 2008-230528 | 10/2008 |
| JP | 2009-012656 | 1/2009 |

OTHER PUBLICATIONS

Extended European Search Report dated Jul. 4, 2011, issued in corresponding European Application No. 10001427.3-1264.

* cited by examiner

*Primary Examiner* — Gerald McClain
(74) *Attorney, Agent, or Firm* — Nixon & Vanderhye PC

(57) ABSTRACT

In an electric power steering system installed in a vehicle and designed to generate, by a motor, assist torque for assisting the driver's turning effort of the steering wheel, a self-aligning torque determiner determines a value of self aligning torque applied to the vehicle. A commanded-value generator determines a value of an assist ratio based on a predetermined relationship between a variable of the self aligning torque and a variable of the assist ratio. The assist ratio represents a ratio of share of torque by the motor for compensating the self aligning torque. The commanded-value generator generates, based on the self aligning torque and the value of the assist ratio, a commanded value for the assist torque. An assist torque determiner determines the assist torque based on the commanded value for the assist torque generated by the commanded-value generator.

4 Claims, 3 Drawing Sheets

ELECTRIC POWER STEERING SYSTEM DESIGNED TO GENERATE TORQUE FOR ASSISTING DRIVER'S TURNING EFFORT

CROSS REFERENCE TO RELATED APPLICATIONS

This application is based on Japanese Patent Application 2009-030266 filed on Feb. 12, 2009. This application claims the benefit of priority from the Japanese Patent Applications, so that the descriptions of which are all incorporated herein by reference.

FIELD OF THE INVENTION

The present invention relates to electric power steering systems, in other words, electric power assisted steering systems, capable of generating torque to assist the driver's turning effort. More particularly, the present invention relates to such electric steering systems designed to control the torque to assist the driver's turning effort; this torque to assist the driver's turning effort will be referred to as "assist torque" hereinafter,

BACKGROUND OF THE INVENTION

Some types of these electric power steering systems are designed to generate the assist torque by a motor and control the assist torque using: torque created based on the driver's turning of a steering wheel; and self aligning torque. The torque created based on the driver's turning of the steering wheel is measured by a torque sensor. The torque sensor is normally disposed between an input shaft rotatable together with the steering wheel and an output shaft, such as a pinion shaft. The torque sensor includes a torsion bar coupling the input shaft and the output shaft, and measures the torque, referred to as "steering torque", based on a torsion angle of the torsion bar by the driver's turning of the steering wheel.

The self aligning torque is the torque (force) that causes a tire/wheel to tend to rotate around its vertical axis. For example, when there is a slip angle of a tire/wheel, the self aligning torque created by the tire/wheel causes the tire/wheel to tend to rotate around its vertical axis toward its straight ahead position.

For example, US Patent Application Publication No. US 2005/0103561 corresponding to Japanese Patent Application Publication No. 2003-200844 discloses an example of these types of electric power steering systems.

The electric power steering system disclosed in the US Patent Application Publication is designed to estimate, by a disturbance observer, the self aligning torque ES using a commanded current Ir for a motor for generating the assist torque and an angular velocity ω of the motor as input parameters. The electric power steering system is also designed to estimate steering reaction force AT using the sum (SatE) of the output Ttb of a transfer function of the spring coefficient KTb of the torsion bar and the self aligning torque ES as an input parameter.

Then, the electric power steering system is designed to feedback the steering reaction force AT through a first feedback loop and the self aligning torque ES through a second feedback loop to the calculation of the assist torque. Specifically, the electric power system is designed to calculate the deviation (AT-T) of the steering torque T from the steering reaction force AT, and input, to a control unit, the deviation (AT-T) so that the control unit controls the motor to thereby generate the assist torque that reduces the deviation (AT-T).

SUMMARY OF THE INVENTION

The inventors have discovered that there are some problems in the power steering system disclosed in the US Patent Application Publication.

Specifically, the power steering system disclosed in the US Patent Application Publication requires, as tuning parameters for tuning the assist torque, the steering torque T and the steering reaction force AT.

The power steering system disclosed in the US Patent Application Publication is designed such that the output Ttb of the transfer function of the spring coefficient KTb of the torsion bar is substantially identical to the steering torque T. This design causes the relationship between the steering reaction force AT and the sum (SatE) of the output Ttb of the transfer unction of the spring coefficient KTb of the torsion bar and the self aligning torque ES to vary with time.

The power steering system disclosed in the US Patent Application Publication also requires the double feedback loops consisting of the first and second feedback loops to determine the assist torque to be generated by the motor.

These problems may make it difficult to tune the assist torque.

The self aligning torque ES changes greatly depending on the steering torque T. In view of this factor, the disturbance observer of the power steering system disclosed in the US Patent Application Publication is designed to estimate the self aligning torque ES using only the commanded current Ir for the motor and the angular velocity ω of the motor. In other words, the disturbance observer of the power steering system disclosed in the US Patent Application Publication is designed to estimate the self aligning torque ES without using any parameter associated with the steering torque T.

For this reason, the accuracy of estimating the self aligning torque ES is insufficient; the results may make it difficult to give the driver comfortable steering feeling.

In view of the circumstances set force above, the present invention seeks to provide electric power steering systems installed in corresponding vehicles and each designed to solve at least one of the problems set forth above.

Specifically, the present invention aims at providing such electric power steering systems each designed to give the driver comfortable steering feeling.

According to one aspect of the present invention, there is provided an electric power steering system installed in a vehicle with a steering wheel and designed to generate, by a motor, assist torque for assisting turning effort of the steering wheel by a driver. The electric power steering system includes a self-aligning torque determiner that determines a self aligning torque applied to the vehicle, and a commanded-value generator. The command-value generator determines a value of an assist ratio based on a predetermined relationship between a variable of the self aligning torque and a variable of the assist ratio. The assist ratio represents a ratio of share of torque by the motor for compensating the self aligning torque. The command-value generator also generates, based on the self aligning torque and the value of the assist ratio, a commanded value for the assist torque. The electric power steering system includes an assist torque determiner that determines the assist torque based on the commanded value for the assist torque generated by the commanded-value generator.

In a first preferred embodiment of this one aspect, the vehicle includes: a torsion bar that couples an input shaft and an output shaft, the input shaft being coupled to the steering wheel; and a steering system that converts, when the torsion bar is twisted through the input shaft based on turning of the steering wheel by the driver so that the output shaft is rotated, rotation of the output shaft into pivot of the wheel. The self-aligning torque determiner includes a first torque sensor that measures a torsion torque based on a twist of the torsion bar. The self-aligning torque determiner is configured to determine the self aligning torque based on the torsion torque measured by the first torque sensor.

The configuration of the system according to the one aspect of the present invention allows a tuning parameter for tuning the assist torque to be regarded only as the predetermined relationship between the variable of the self aligning torque and the variable of the assist ratio; the predetermined relationship does not vary with time.

Thus, it is possible to easily design the electric power steering system so as to give the driver comfortable steering feeling.

In a second preferred embodiment of the one aspect, the self-aligning torque determiner includes a disturbance observer, the disturbance observer is configured to estimate the self aligning torque based on the commanded value for the assist torque, the torsion torque measured by the first torque sensor, and a rotational speed of the motor.

The configuration of the second preferred embodiment of the one aspect makes it possible to eliminate the need to provide any specific mechanical member that determines the self aligning torque. The configuration of the second preferred embodiment of the one aspect estimates the self aligning torque using, in addition to the commanded value for the assist torque and the rotational speed of the motor, the torsion torque. Because the torsion torque is due to twist (torsion) of the torsion bar based on torque inputted by driver's turning of the steering wheel, the estimated self aligning torque depends on the torque inputted by the driver's turning of the steering wheel.

Thus, it is possible to improve the accuracy of estimating the self aligning torque in comparison to the conventional structure that estimates the self aligning torque without using the torque inputted by the driver's turning of the steering wheel. The configuration of the second preferred embodiment of the one aspect requires a feedback loop of the commanded value for the assist torque, but does not require double feedback loops. Thus, it is possible to more easily estimate the self aligning torque in comparison to the conventional structure that estimates the self aligning torque using the double feedback loops.

In a third preferred embodiment of the one aspect, the disturbance observer has a cutoff frequency determined to separate a first frequency range and a second frequency range. The first frequency range contains first frequency components of the self aligning torque, and the first frequency components are due to road reaction force caused when the driver turns the steering wheel. The second frequency range contains second frequency components of the self aligning torque, and the second frequency components are due to a transfer, to the vehicle, of a condition of a road surface on which the vehicle is located.

The configuration of the third preferred embodiment of the one aspect can eliminate the second frequency components to thereby estimate, as the value of the self aligning torque, one of the first frequency components of the self aligning torque so that the assist torque is set to be changed little with the second components of the self aligning torque. The results transfer directly one of the first frequency components of the self aligning torque to the steering wheel; this direct transfer allows the driver to grasp the corresponding road surface conditions from the driver's steering feeling of the steering wheel. Because the road reaction force caused when the driver turns the steering wheel is reflected on the assist torque, it is possible to maintain at high level the driver's steering feeling.

In a fourth preferred embodiment of the one aspect, the self-aligning torque determiner further comprises a second torque sensor located close to or in a torque-transmission train from the first torque sensor to the wheel and configured to measure the self aligning torque.

A preferred fifth embodiment of the one aspect further includes a stabilizing controller that calculates, based on the torsion torque, a compensation value; this compensation value is required to stabilize a whole of the power steering system. The commanded-value generator is configured to calculate, as a basic assist request value for the assist torque, a product of the value of the assist ratio and the self aligning torque, and generate the commanded value for the assist torque based on the basic assist request value and the compensation value. The stabilizing controller is configured to change the compensation value depending on the value of the assist ratio.

The inventors have found out that the relationship between the torque to be inputted by the driver's turning of the steering wheel and the torsion torque is changed with change in the assist ratio. Thus, if the compensation value was determined independently of the assist ratio, it would be difficult for the electric power steering system of this forth preferred embodiment to adjust stably the assist torque.

However, the configuration of the fourth preferred embodiment of the one aspect changes the compensation value with change in the value of the assist ratio, making it possible to sufficiently adjust the assist torque.

In a preferred sixth embodiment of the one aspect, the stabilizing controller includes a first compensator that calculates, based on the torsion torque, a minimum limit of the compensation value assuming that the value of the assist ratio determined by the commanded-value generator is a preset minimum value, and a second compensator that calculates, based on the torsion torque, a maximum limit of the compensation value assuming that the value of the assist ratio determined by the commanded-value generator is a preset maximum value. The stabilizing controller also includes a linear interpolator that linearly interpolates the minimum limit and the maximum limit based on the value of the assist ratio determined by the commanded-value generator to thereby determine the compensation value.

The configuration of the preferred sixth embodiment of the one aspect makes simplifier the structure of the stabilizing controller capable of determining the compensation value depending on the value of the assist ratio.

BRIEF DESCRIPTION OF THE DRAWINGS

Other objects and aspects of the invention will become apparent from the following description of embodiments with reference to the accompanying drawings in which.

Figure 2:
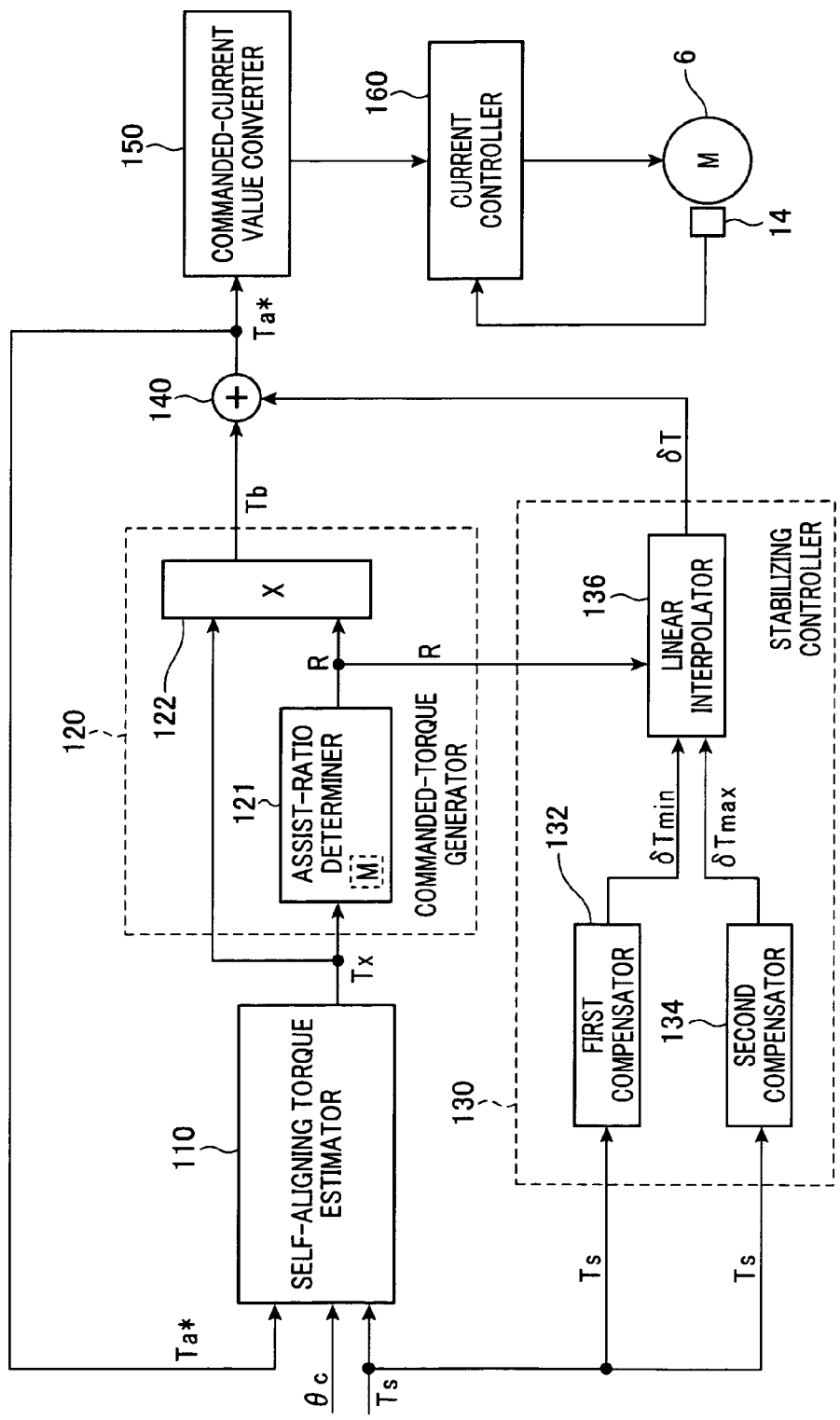
FIG. 2 is a block diagram schematically illustrating an example of the overall functional structure of the electric power steering system illustrated in FIG. 1.

resonance characteristic curves of the control system illustrated in FIG. 2, which have been obtained when a controller carries out the adjustment of assist torque directly using a basic request assist value as a commanded assist value while changing an assist ratio; and resonance characteristic curves of the control system illustrated in FIG. 2, which have been obtained when the controller carries out the adjustment of the assist torque using the sum of the basic request assist value and a compensation value as the commanded assist value while changing the assist ratio.

DETAILED DESCRIPTION OF EMBODIMENTS OF THE INVENTION

An embodiment of the present invention will be described hereinafter with reference to the accompanying drawings. In the drawings, identical reference characters are utilized to identify identical corresponding components.

An electric power steering system EPS according to the embodiment of the present invention is installed in, for example, a four-wheel motor vehicle. The electric power steering system EPS includes a controller 1, a torque sensor 4, a decelerating mechanism 5, a motor 6, a rotational angle sensor 13, and a motor-current sensing circuit 14.

The torque sensor 4 is made up of a torsion bar 4a and a sensing element 4b.

Torsion bar 4a is, for example, a long spring steel rod. One end of the torsion bar 4a is coupled to a steering shaft (steering column) 3 of the motor vehicle to which a steering wheel 2 of the motor vehicle is coupled. The steering shaft 3 is configured to be rotatable together with the steering wheel 2. The other end of the torsion bar 4a is coupled to one end of an intermediate shaft 7.

The decelerating mechanism 5 is made up of a gear mechanism 5a, For example, the gear mechanism 5a is provided with a wheel gear and a worm gear. The wheel gear is so mounted on the steering shaft 7 as to be rotatable therewith. The worm gear is engaged with the wheel gear, and fixedly coupled to an output shaft of the motor 6.

The controller 1 is communicably connected to the torque sensor 4, the motor 6, the rotational angle sensor 13, the motor-current sensing circuit 14, and a vehicle speed sensor 12; this vehicle speed sensor 12 is installed in the motor vehicle according to the embodiment. The motor 6 is operative to generate assist torque for assisting the driver's turning effort of the steering wheel 2.

Rotation of the steering shaft 3 relative to the intermediate shaft 7 causes the torsion bar 4a to be twisted against the elastic force of the torsion bar 4a. The sensing element 4b measures the torsion (twist) of the torsion bar 4a as torsion torque Ts. Specifically, each time the torsion bar 4a is twisted, the sensing element 4b sends, to the controller 1, a signal indicative of the corresponding torsion torque Ts.

The gear mechanism 5a of the decelerating mechanism 5 is designed to transfer rotation of the output shaft of the motor 6 to the intermediate shaft 7 (steering shaft 3) while reducing the rotational speed, in other words, increasing torque by the rotation of the output shaft of the motor 6.

The motor 6 is made up of, for example, an armature and a field member. When a drive current for the motor 6 is supplied to flow through the armature so that the armature generates a magnetic field, the generated magnetic field of the armature and a magnetic field generated by the field member rotate any one of the armature and the field member relative to the other thereof to thereby rotate the output shaft of the motor 6.

The motor vehicle is installed with a steering system SS. The steering system SS is made up of a gear box 8, tie rods (not shown), steering knuckles (not shown), and so on.

The gear box 8 consists of a pinion shaft 9 and a rack 10 engaged with each other. The rack 10 is coupled at their both ends to the tie rods coupled to knuckle arms (steering arms) serving as an integral part of the steering knuckles. The steering knuckles are coupled to, for example, front wheels of the motor vehicle.

The other end of the intermediate shaft 7 is coupled to the pinion shaft 9. Rotation of the intermediate shaft 7 rotates the pinion shaft 9. Rotation of the pinion shaft 9 is converted by the gear box 8 into straight-line motion of the rack 10 and the tie rods. Straight-line motion of the tie rods pivot the knuckle arms to thereby pivot the front wheels by angles corresponding to the displacement of the rack 10.

The vehicle speed sensor 12 is operative to, for example, continuously measure the actual vehicle speed V of the motor vehicle, and output a signal indicative of the actual vehicle speed V to the controller 1. The rotational angle sensor 13 is operative to, for example, continuously measure the actual rotational angle θc of the motor 6 relative to a preset reference position, and output a signal indicative of the actual rotational angle θc of the motor 6 to the controller 1.

The motor-current sensing circuit 14 is operative to, for example, continuously measure a value of the drive current to be supplied to the armature of the motor 6, and output a signal indicative of the value of the drive current to the controller 1.

Note that the assist torque to be created by the motor 6 is represented as a function of a variable of the drive current to be supplied to the motor 6 from the controller 1. Thus, the controller 1 is designed to adjust the drive current to be supplied to the motor 6 based on the signals inputted thereto from the sensors 4, 12, 13, and 14 to thereby adjust the assist torque.

For example, the controller 1 is made up of, for example, a normal microcomputer; this microcomputer can consist of, for example, a CPU, at least one storage medium, an I/O device, and/or peripheral devices for the CPU.

Next, the functional structure of the controller 1 for adjusting the assist torque that assists the driver's turning effort of the steering wheel 2 will be described hereinafter. In the embodiment, at least part of the functional structure of the controller 1 is implemented by the microcomputer.

Referring to FIG. 2, the controller 1 is functionally equipped with a self-aligning torque estimator 110, a commanded-torque generator 120, a stabilizing controller 130, an adder 140, a commanded-current value converter 150, and a current controller 160. These functional blocks except for part of the current controller 160 can be implemented by one or more programs installed in the controller 1.

The components 110, 120, 130, and 140 are designed to operate in cooperation with each other to thereby determine a commanded assist value Ta* as a commanded value for the assist torque to be generated by the motor 6.

The commanded-current value converter 150 previously stores therein a data file F as a map or at least one relational expression. The data file F represents the assist torque as the function of the drive current to be supplied to the motor 6. In other words, the data file F represents a relationship between a variable of the assist torque and that of the drive current to be supplied to the motor 6.

When the commanded assist value Ta* is inputted thereto, the commanded-current value converter 150 converts, based on the data file F, the commanded assist value Ta* to a commanded current value corresponding thereto on the function.

The current controller 160 is provided with a motor driver. The motor driver is made up of, for example, an available bridge circuit consisting of, for example, four power transistors, such as four MOSFETs.

The motor driver is designed to change, based on a DC voltage applied thereto, the drive current to be applied to the motor 6 under control of the current controller 160. For example, when the motor driver is made up of an H bridge circuit consisting of four MOSFETs, the current controller controls the on and off timings, that is, duty cycle, of each of the MOSFETs so as to change a voltage to be applied to the motor 6, thus changing the drive current to be applied to the motor 6.

Specifically, the current controller 160 is designed to carry out feedback control of the motor driver to thereby match a value of the drive current measured by the motor-current sensing circuit 14 with a commanded current value to be supplied from the commanded-current value converter 150.

Note that, in the embodiment, the motor-current sensing circuit 14 is provided with a current sensing resistor provided between an output terminal of the motor driver and a ground line thereof, and the motor-current sensing circuit 14 is designed to measure a voltage across the current sensing resistor to thereby measure the drive current flowing through the armature of the motor 6.

Next, operations of the controller 1 to determine the commanded assist value Ta* will be described hereinafter.

The commanded assist value Ta* is the sum of a basic request assist value Tb and a compensation value δT. The commanded-torque generator 120 generates the basic request assist value Tb based on a self aligning torque Tx estimated by the self-aligning torque estimator 110.

The self aligning torque Tx is the torque (force) that causes each wheel 11 (the tire of each wheel 11) to tend to rotate it around its vertical axis. For example, when there is a slip angle of the tire of each wheel 11, the self aligning torque created by each wheel 11 causes the tire of a corresponding one of the wheels 11 to tend to rotate around its vertical axis.

For example, the self aligning torque Tx includes torque due to the road reaction force caused when the driver turns the steering wheel 2, and/or torque due to the rotation of each wheel 11 (the tire of each wheel 11) caused when there are irregularities on the contact patch.

First, operations of the self-aligning torque estimator 110 will be described hereinafter.

The self-aligning torque estimator 110 is designed as a disturbance observer to receive the torsion torque Ts, the rotational angle θc of the motor 6, and the commanded assist value Ta*; these parameters are inputted to the controller 1. The self-aligning torque estimator 110 is designed to estimate, based on the torsion torque Ts, the rotational angle θc of the motor 6, and the commanded assist value Ta*, an estimated value of the self aligning torque Tx in accordance with the following equation (1);

$$\tilde{T}x = \frac{1}{\tau s+1}(Ta+Ts) - \frac{s}{\tau s+1}\theta c' Ic - \frac{1}{\tau s+1}Cc\theta c' \quad [1]$$

where $\tilde{T}x$ represents an estimated value of the self aligning torque, τ represents a cutoff frequency, and s represents Laplace operator (differential operator).

Note that the cutoff frequency τ in the equation [1] is determined to a frequency that separates: the first frequency range of the first components of the self aligning torque Tx due to the road reaction force caused when the driver turns the steering wheel 2; and the second frequency range of the second components of the self aligning torque Tx due to the transfer of the conditions of the road surface to the front wheels 11 (the tires of the front wheels 11). For example, the second components of the self aligning torque is caused when there are irregularities on the contact patch due to the road surface.

Specifically, the cutoff frequency τ is set to 5 Hz that eliminates the second components of the self aligning torque Tx.

For this reason, the self aligning torque Tx is mainly due to the road reaction force caused when the driver turns the steering wheel 2.

Figure 1:
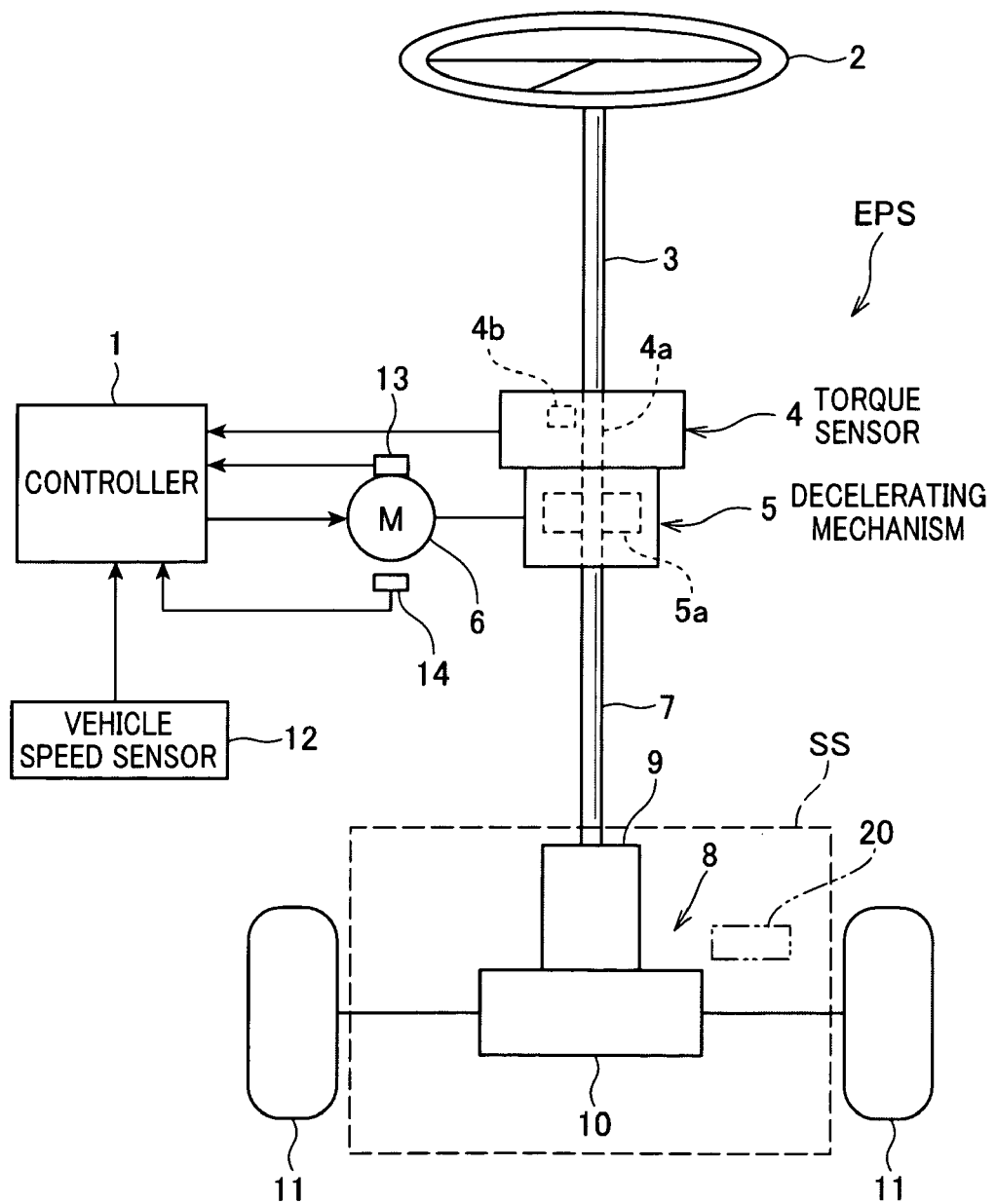
FIG. 1 is a view schematically illustrating an example of the overall structure of an electric power steering system according to an embodiment of the present invention.
Figure 3:
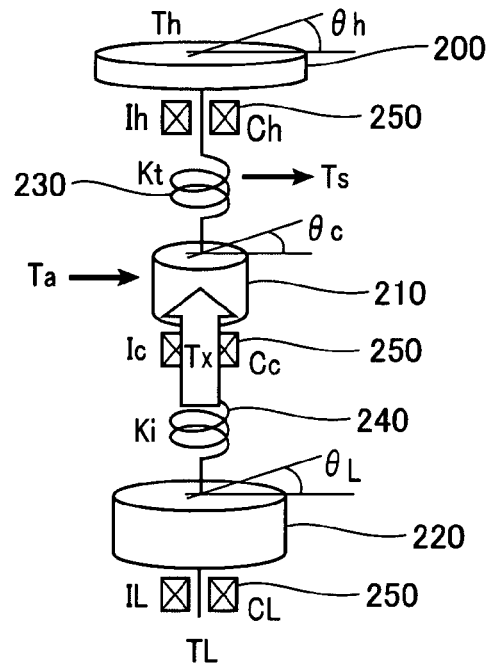
FIG. 3 is a view schematically illustrating an example of the model of the electric power steering system illustrated in FIG. 1.

The equation [1] is derived from a model M of the electronic power steering system EPS illustrated in FIG. 1; this model M is illustrated in FIG. 3 as an example.

Next, the model M of the electric power steering system EPS will be described hereinafter with reference to FIG. 3.

The model M illustrated in FIG. 3 comprises a steering-wheel portion 200, a motor portion 210, and a pinion-rack portion 220. The steering-wheel portion 200 is coupled to one end of a spring 230 with a torsion spring coefficient Kt corresponding to the torsion bar 4a, and the motor portion 210 is coupled to the other end of the spring 230. The motor portion 210 is coupled to one end of a spring 240 with a torsion spring coefficient Ki corresponding to the intermediate shaft 7, and the pinion-rack portion 220 is coupled to the other end of the spring 240. Reference numeral 250 represents a factional resistance caused when a corresponding one of portions 200, 210, and 220 is turned.

In FIG. 3, reference character Th represents torque inputted by the driver's turning of the steering-wheel portion 200, reference character Ta represents the assist torque created by the motor portion 210, and reference character Ts represents the torsion torque set forth above. The torque Th will be referred to as "inputted torque" hereinafter.

Reference character θh represents a displacement (rotation) angle of the steering-wheel portion 200, reference character θc represents a displacement angle of the output shaft of the motor portion 210, and reference character $\theta_L$ represents a displacement angle of the pinion-rack portion 220.

In FIG. 3, reference character Ih represents a moment of inertia of the steering-wheel portion 200, reference character Ic represents a moment of inertia of the output shaft of the motor portion 210, and reference character $I_L$ represents a moment of inertia of the pinion-rack portion 220. Reference character Ch represents a rotational friction coefficient of the steering-wheel portion 200, reference character Cc represents a rotational friction coefficient of the motor portion 210, and reference character $C_L$ represents a rotational friction coefficient of the pinion-rack portion 220.

From the model M illustrated in FIG. 3, the following equation [2] as the equation of the rotary motion of the steering-wheel portion 200 is established:

$$Ih\theta h'' = Th - Ch\theta h' - Kt(\theta h - \theta c) \quad [2]$$

where θh" represents the angular acceleration of the steering-wheel portion 200 corresponding to the second order differential of the displacement angle θh of the steering-wheel portion 200. Here, the friction based on the rotational friction coefficient Ch of the steering-wheel portion 200 produces torque proportional to the rate of change in the displacement angle θh the steering-wheel portion 200; this torque is opposite in direction to the inputted torque Th. Thus, –Chθh' represents the torque produced by the rotational friction coefficient Ch.

In addition, in the equation [2], the spring 230 produces torque proportional to the relative displacement angle ($\theta h'' \theta c$) of the spring 230 (torsion bar 4a); this torque is opposite in direction to the inputted torque Th. Thus, $-Kt(\theta h - \theta c)$ represents the torque produced by the spring 230 (torsion bar 4a).

Similarly, from the model M illustrated in FIG. 3, the following equation [3] as the equation of the rotary motion of the output shaft of the motor portion 210 is established:

$$Ic\theta c'' = Ta + Kt(\theta h - \theta c) - Cc\theta c' - Ki(\theta c - \theta_L) \quad [3]$$

where $\theta c''$ represents the angular acceleration of the output shaft of the motor portion 210 corresponding to the second order differential of the displacement angle $\theta c$ of the output shaft of the motor portion 210. Here, $Kt(\theta h - \theta c)$ represents torque applied to the spring 230 (torsion bar) 4a. The friction based on the rotational friction coefficient Cc of the motor portion 210 produces torque proportional to the rate of change in the displacement angle $\theta c$ of the output shaft of the motor portion 210; this torque is opposite in direction to the assist torque Ta. Thus, $-Cc\theta c'$ represents the torque produced by the rotational friction coefficient Cc.

In addition, in the equation [3], the spring 240 produces torque proportional to the relative displacement angle ($\theta c - \theta_L$) of the spring 240 (intermediate shaft 7; this torque is opposite in direction to the assist torque Ta. Thus, $-Ki(\theta c - \theta_L)$ represents the torque produced by the spring 240 (intermediate shaft 7).

In addition, from the model M illustrated in FIG. 3, the following equation [4] as the equation of the rotary motion of the pinion-rack portion 220 is established:

$$I_L \theta_L'' = Ki(\theta c - \theta_L) - C_L \theta_L' - T_L \quad [4]$$

where $\theta_L''$ represents the angular acceleration of the pinion-rack portion 220 corresponding to the second order differential of the displacement angle $\theta_L$ of the pinion-rack portion 220. Here, $Ki(\theta c - \theta_L)$ represents torque, referred to as "intermediate torque", applied to the spring 240 (intermediate shaft 7). The friction based on the rotational friction coefficient $C_L$ of the pinion-rack portion 220 produces torque proportional to the rate of change in the displacement angle $\theta_L$ of the pinion-rack portion 220; this torque is opposite in direction to the intermediate torque. Thus, $-C_L \theta_L'$ represents the torque produced by the rotational friction coefficient $C_L$. Reference character $T_L$ is the torque applied to the tires of the front wheels 11 based on reaction force from the corresponding road surface against the inputted torque Th and the assist torque Ta.

In the model M illustrated in FIG. 3, the torque transferred from the tires (front wheels 11) to the torsion bar 4a, in other words, the self aligning torque Tx, is obtained by the torque applied to the spring 240 representing the intermediate shaft 7. Thus, the self aligning torque Tx is represented by the following equation [5]:

$$Tx = Ki(\theta c - \theta_L) \quad [5]$$

Using the equation [3] allows the equation [5] to be deformed into the following equation [6]:

$$Tx = Ta + Kt(\theta h - \theta c) - Ic\theta c'' - Cc\theta c' \quad [6]$$

The second term on the right side of the equation [6] represents the torsion torque Ts. Thus, because the moment of inertia of each of the steering-wheel portion 200, the motor portion 210, and the pinion-rack portion 220 has been determined as designed values of the model M, the equation [6] shows that the assist torque Ta, the torsion torque Ts, and the angular acceleration of the output shaft of the motor portion 210 allow the self aligning torque Tx to be estimated.

In order to eliminate noise, when a low-pass filter represented as a transfer function of $1/(\tau s + 1)$ is applied to the system defined by the equation [6], the following equation [7] is obtained:

$$\tilde{T}x = \frac{1}{\tau s + 1}(Ta + Ts - Ic\theta c'' - Cc\theta c') \quad [7]$$

Deformation of the equation [7] allows the equation [1] set forth above to be obtained.

Returning to FIG. 2, the self aligning torque Tx estimated by the self-aligning torque estimator 110 is inputted to the commanded-torque generator 120. The commanded-torque generator 120 functionally includes an assist-ratio determiner 121 and a multiplier 122.

The assist-ratio determiner 121 serves as a module that determines the ratio of the motor's share of torque for compensating the self aligning torque Tx within a range from 0 to 1; this ratio will be referred to as "assist ratio R". For example, the assist-ratio determiner 121 stores therein an assist-ratio determining map M designed as, for example, a data table or a program. The assist-ratio determining map M represents a function (relationship) between a variable of the self aligning torque Tx and a variable of the assist ratio R. The function can have been determined based on data obtained by tests using the electric power steering system EPS illustrated in FIG. 1 or its equivalent computer model.

For example, the assist-ratio determining map M has been determined such that the assist ratio R is proportional to the self aligning torque Tx. Specifically, when the self aligning torque Tx takes a value within a first lower range, the assist torque R takes a value within a second lower range corresponding to the first lower range. In addition, when the self aligning torque Tx takes a value within a first higher range, the assist torque R takes a value within a second higher range corresponding to the Erst higher range.

Preferably, the assist-ratio determining map M has been determined such that the assist ratio R is proportional to the self aligning torque Tx until the self aligning torque Tx is within a preset range, and is constant when the self aligning torque Tx exceeds the preset range.

The assist-ratio determining map M determined set forth above allows, when the self aligning torque Tx is within a lower range during the motor vehicle running at high speed, the assist ratio R to be set within a lower range corresponding to the lower range of the self aligning torque Tx. This set restricts small circumferential vibrations of the steering wheel 2, and gives the driver suitable reaction torque when turning the steering wheel 2.

In addition, the assist-ratio determining map M determined set forth above allows, when the self aligning torque Tx is within a higher range during the motor vehicle running at low speed, such as, the driver doing the parking, the assist ratio R to be set within a higher range corresponding to the higher range of the self aligning torque Tx. This set allows the driver to turn the steering wheel easily (lightly) with an aid of the motor 6.

The multiplier 122 is designed to multiply the self aligning torque Tx estimated by the estimator 110 by the assist ratio R determined by the assist-ratio determiner 121 to thereby achieve a value as the basic request assist value Tb. The multiplier 122 is designed to output, to the adder 140, the basic request assist value Tb.

The adder 140 is designed to add the basic request assist value Tb to a compensation value δT determined by the stabilizing controller 130 to thereby calculate the commanded assist value Ta*.

Next, the stabilizing controller 130 will be described hereinafter.

The stabilizing controller 130 is designed such that its characteristics vary depending on the assist ratio R. Specifically, the stabilizing controller 130 is designed to determine the compensation value δT on the basis of the characteristics defined by a value of the assist ratio R from the torsion torque Ts as an input for the defined characteristics.

The reason why the stabilizing controller 130 is designed such that its characteristics vary depending on the assist ratio R is as follows:

Specifically, the change in the assist ratio R changes a resonance characteristic of a control system designed to output the torsion torque Ts from an input of the inputted torque Th by the driver's turning of the steering wheel 2.

Figure 4:
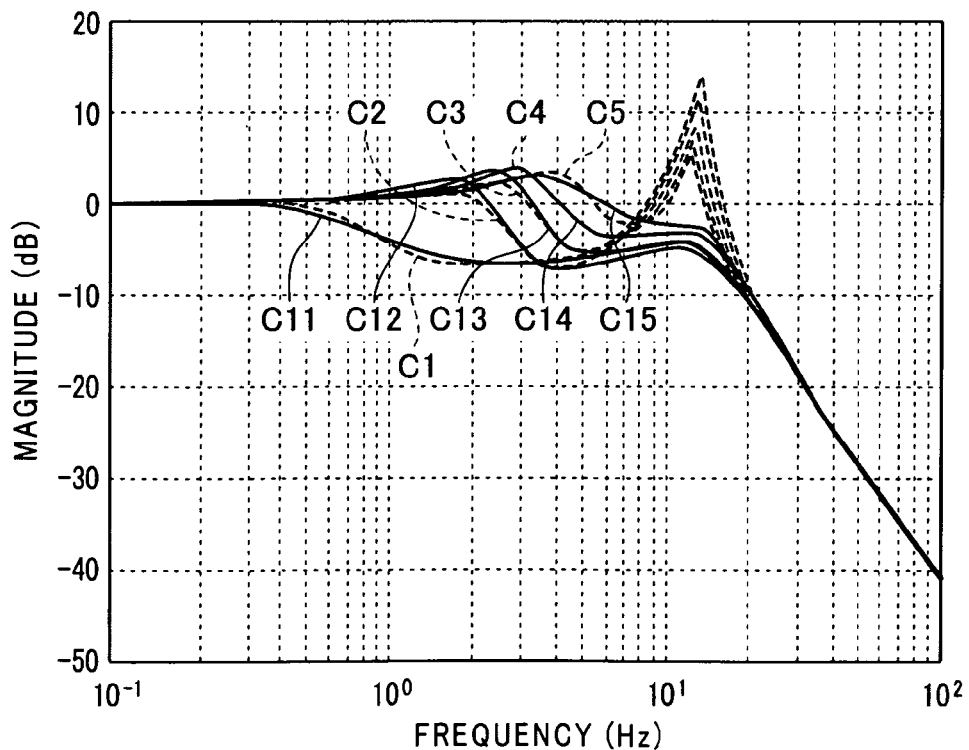
FIG. 4 is a Bode diagram schematically illustrating.

FIG. 4 illustrates a Bode diagram of a resonance characteristic of the control system illustrated in FIG. 2. A plurality of dashed lines illustrated in FIG. 4 represent different resonance characteristic curves C1, C2, C3, C4, and C5 that have been obtained when the controller 110 carries out the adjustment of the assist torque directly using the basic request assist value Tb as the commanded assist value Ta* while changing the assist ratio R Thus, the resonance characteristic curves C1 to C5 correspond to the different values of the assist ratio R, respectively.

FIG. 4 shows that the resonance characteristic of the control system illustrated in FIG. 2 is changed with change in the assist ratio R when, for each assist torque adjustment, the basic request assist value Tb is directly used as the commanded assist value Ta*. Specifically, the resonance characteristic of the control system illustrated in FIG. 2 obtained directly using the basic request assist value Tb as the commanded assist value Ta* is increased with increase in the assist ratio R.

The stabilizing controller 130 functionally includes a first compensator 132, a second compensator 134, and a linear interpolator 136.

The first compensator 132 has a transfer function Gmin(z) for stabilizing the control system illustrated in FIG. 2 assuming that the assist ratio R is zero as a preset minimum value.

Specifically, the first compensator 132 is designed to calculate a first compensation value (minimum limit) δTmin each time the torsion torque Ts is inputted thereto in accordance with the following equation [8]:

$$\delta T \min = G \min(z) \cdot Ts \quad [8]$$

The second compensator 134 has a transfer function Gmax (z) for stabilizing the control system illustrated in FIG. 2 assuming that the assist ratio R is a maximum value Rmax. Note that the maximum value has been determined by tests using the electric power steering system EPS illustrated in FIG. 1 or its equivalent computer model.

Specifically, the second compensator 134 is designed to calculate a second compensation value (maximum limit) δTmax each time the torsion torque Ts is inputted thereto in accordance with the following equation [9];

$$\delta T \max = G \max(z) \cdot Ts \quad [9]$$

To the linear interpolator 136, the assist ratio R, the first compensation value δTmin, and the second compensation value δTmax are inputted. The linear interpolator 136 is designed to linearly interpolate the first and second compensation values δTmin and δTmax based on the assist ratio R to thereby determine the compensation value δT depending on the assist ratio R. Specifically, the linear interpolator 136 is designed to determine the compensation value δT accordance with the following equations [10a to 10e]:

$$\frac{\delta T - \delta T\min}{\delta T\max - \delta T\min} = \frac{R - 0}{R\max - 0} \quad [10a]$$

$$\delta T - \delta T\min = \frac{R}{R\max}(\delta T\max - \delta T\min) \quad [10b]$$

$$\delta T = \frac{R}{R\max}(\delta T\max - \delta T\min) + \delta T\min \quad [10c]$$

$$\delta T = \frac{R}{R\max}\delta T\max - \frac{R}{R\max}\delta T\min + \frac{R\max}{R\max}\delta T\min \quad [10d]$$

$$\delta T = \frac{R\max - R}{R\max}\delta T\min + \frac{R}{R\max}\delta T\max \quad [10e]$$

Then, as described above, the compensation value δT determined by the stabilizing controller 130 is added to the basic request assist value Tb so that the sum of the compensation value δT and the basic request assist value Tb is supplied, as the commanded assist value Ta*, to the commanded-current value converter 150.

Thereafter, as described above, the commanded assist value Ta* is converted by the commanded-current value converter 150 to a commanded current value corresponding thereto on the function stored in the commanded-current value converter 150. The current controller 160 performs feedback control of the motor driver to thereby match a value of the drive current measured by the motor-current sensing circuit 14 with the commanded current value to be supplied from the commanded-current value converter 150.

FIG. 4 shows a plurality of solid lines represent different resonance characteristic curves C11, C12, C13, C14, and C15 that have been obtained when the controller 110 carries out the adjustment of the assist torque using the sum of the basic request assist value Tb and the compensation value δT as the commanded assist value Ta* while changing the assist ratio R. Thus, the resonance characteristic curves C11 to C15 correspond to the different values of the assist ratio R, respectively; these different values of the assist ratio R for the resonance characteristic curves C11 to C15 correspond to the represent different resonance characteristic curves C1, C2, C3, C4, and C5, respectively.

FIG. 4 clearly shows that the resonance characteristic curves C11 to C15 are more stabilized as compared with the resonance characteristic curves C1 to C5 independently of the change in the assist ratio R. In other words, the variations in the torsion torque Ts in response to the change in the inputted torque inputted by the driver's turning of the steering wheel are uniformed irrespective of the change in the amount of the driver's turning of the steering wheel 2. This uniform allows the driver to easily understand the behavior of the vehicle when turning the steering wheel 2. Thus, the adjustment of the assist torque using, as the commanded assist value Ta*, the sum of the basis request assist value Tb and the compensation value δT gives the driver comfortable steering feeling.

As described above, the electric power steering system EPS according to the embodiment is operative to estimate the self aligning torque Tx, and determine the assist ratio R based on the self aligning torque Tx and the assist-ratio determining map M. The electric power steering system EPS is also operative to multiply the self aligning torque Tx by the assist ratio R to thereby calculate the basic request assist value Tb as the basis of the commanded assist value Ta*.

Specifically, the electric power steering system EPS is designed to use, as tuning parameters for calculating the basic request assist value Tb, only information indicative of the relationship between a variable of the self aligning torque Tx and that of the assist ratio R; this relationship does not vary with time. The results make it possible for designers to easily design the electric power steering system EPS so that drivers can obtain comfortable steering feeling.

The electric power steering system EPS according to the embodiment is also designed to use a disturbance observer (self-aligning torque estimator 110) to thereby estimate the self aligning torque Tx as disturbance torque. This design eliminates the need to provide specific mechanical structures for determining the self aligning torque Tx.

In addition, the electric power steering system EPS is designed to estimate the self aligning torque Tx using, in addition to the rotational angle θc of the motor 6 and the commanded assist value Ta*, the torsion torque Ts created by the driver's turning of the steering wheel 2. That is, the electric power steering system EPS is designed to estimate the self aligning torque Tx in consideration of a parameter associated with the inputted torque based on the driver's turning of the steering wheel 2. This design improves the accuracy of estimating the self aligning torque Tx.

Moreover, the electric power steering system EPS is configured to have only one feedback loop that feedbacks the commanded assist value Ta* to adjust the assist torque Ts without using double feedback loops disclosed in the US Patent Application Publication set forth above. This configuration makes it easy to tune the assist torque Ts for giving the deriver comfortable steering feeling.

The electric power steering system EPS is provided with the stabilizing controller 130 that calculates the compensation value δT depending on the torsion torque Ts, and designed to determine the commanded assist value Ta* based on the compensation value δT that changes depending on the assist ratio R. This design sufficiently stabilizes the adjustment of the assist torque Ts independently of the change in the assist torque R.

With the electric power steering system EPS, the stabilizing controller 130 is provided in parallel to the commanded torque generator 120. This maintains easy the tuning ability of the assist-ratio determining map M independently of using the stabilizing controller 130.

With the electric power steering system EPS, the cutoff frequency τ of the disturbance observer 112 is set to 5 Hz that eliminates the second components of the self aligning torque Tx due to the transfer of the corresponding road surface conditions to the front wheels 11. This set allows the assist torque Ta to be little changed with change in the self aligning torque Tx due to the transfer of the corresponding road surface conditions. Thus, the self aligning torque Tx due to the transfer of the corresponding road surface conditions to the tires of the front wheels 11 can be directly transferred to the steering wheel 2. This direct transfer allows the driver to grasp the corresponding road conditions from the driver's steering feeling of the steering wheel 2.

In the embodiment, the cutoff frequency τ of the self-aligning torque estimator 110 is set to 5 Hz, but can be set to be within a range from 5 Hz to 10 Hz or thereabout.

In the embodiment, the torque sensor 4 is designed to measure the twist of the torsion bar 4a generated based on the inputted torque inputted by the driver's turning of the steering wheel 2 to thereby detect the torsion torque (steering torque), but can be designed as another structure to detect the torsion torque (steering torque).

In the embodiment, the electric power steering system EPS is designed to determine the self-aligning torque Tx by estimating it using the self-aligning torque estimator 110, but the present invention is not limited thereto.

Specifically, a torque sensor 20 can be provided close to or in a torque-transmission train from the torque sensor 4 and the tires of the front wheels 11. The second sensor serving as part of a self-aligning torque determiner is operative to measure a signal indicative of the self-aligning torque Tx and to output the signal to the commanded torque generator 120.

In the embodiment, the electric power steering system EPS is designed as a column-assist (shaft-assist) electric power steering system, but the present invention is not limited to the application. Specifically, the present invention can be applied to other assist-types of electric power steering system, such as lack-assist electric power steering systems for assisting the straight-line motion of the rack.

While there has been described what is at present considered to be the embodiment and its modifications of the present invention, it will be understood that various modifications which are not described yet may be made therein, and it is intended to cover in the appended claims all such modifications as fall within the scope of the invention.

What is claimed is:

1. An electric power steering system comprising:
   a torque sensor having a torsion bar that couples a steering-side input shaft and a tire-side output shaft, the torque sensor measuring a torque applied to the torsion bar based on a twist of the torsion bar; and
   a motor generating assist torque,
   wherein the electric power steering system further comprises:
   a self-aligning torque determiner that determines a self aligning torque created by a tire; and
   a commanded-torque generator that:
   determines a value of an assist ratio based on a predetermined relationship between the self aligning torque and the assist ratio, the assist ratio representing a ratio of share of torque by the motor for compensating the self aligning torque; and
   generates, based on the self aligning torque and the value of the assist ratio, a commanded torque, and
   wherein the assist torque to be generated by the motor is determined based on the commanded torque generated by the commanded-torque generator;
   a stabilizing controller that calculates, based on the torque measured by the torque sensor, a compensation, the compensation being to stabilize a whole of the electric power steering system including:
   the torque measured by the torque sensor with respect to torque inputted to a steering wheel, and a speed of the motor,
   wherein a commanded value for the assist torque is determined based on a basic assist request value and the compensation calculated by the stabilizing controller, the basis assist request value being obtained as a product of the value of the assist ratio and the self aligning torque, and
   the stabilizing controller changes the compensation depending on the value of the assist ratio;
   wherein the stabilizing controller comprises:
   a first compensator that calculates, based on the torque measured by the torque sensor, a value of the compensation as a minimum compensation value assuming that the value of the assist ratio is a preset minimum value;
   a second compensator that calculates, based on the torque measured by the torque sensor, a value of the compensation assuming that the value of the assist ratio is a preset maximum value; and a linear interpolator that determines, using linear interpolation, the value of the compensation corresponding to the value of the assist ratio determined by the commanded-torque generator.

2. The electric power steering system according to claim 1, wherein the self-aligning torque determiner estimates, using a disturbance observer, the self aligning torque based on a commanded value for the assist torque, a measured value of the torque sensor, and a rotational speed of the motor.

3. The electric power steering system according to claim 2, wherein a cutoff frequency of the disturbance observer is determined to a frequency that separates: a frequency range of the self-aligning torque due to road reaction force caused when a driver turns a steering wheel; and a frequency range of the self-aligning torque due to a transfer, to the tire, of a condition of a road surface.

4. The electric power steering system according to claim 1, further comprising, as the self-aligning torque determiner, a second torque sensor located in a torque-transmission train from the first torque sensor to the tire.

* * * * *